UNITED STATES PATENT OFFICE.

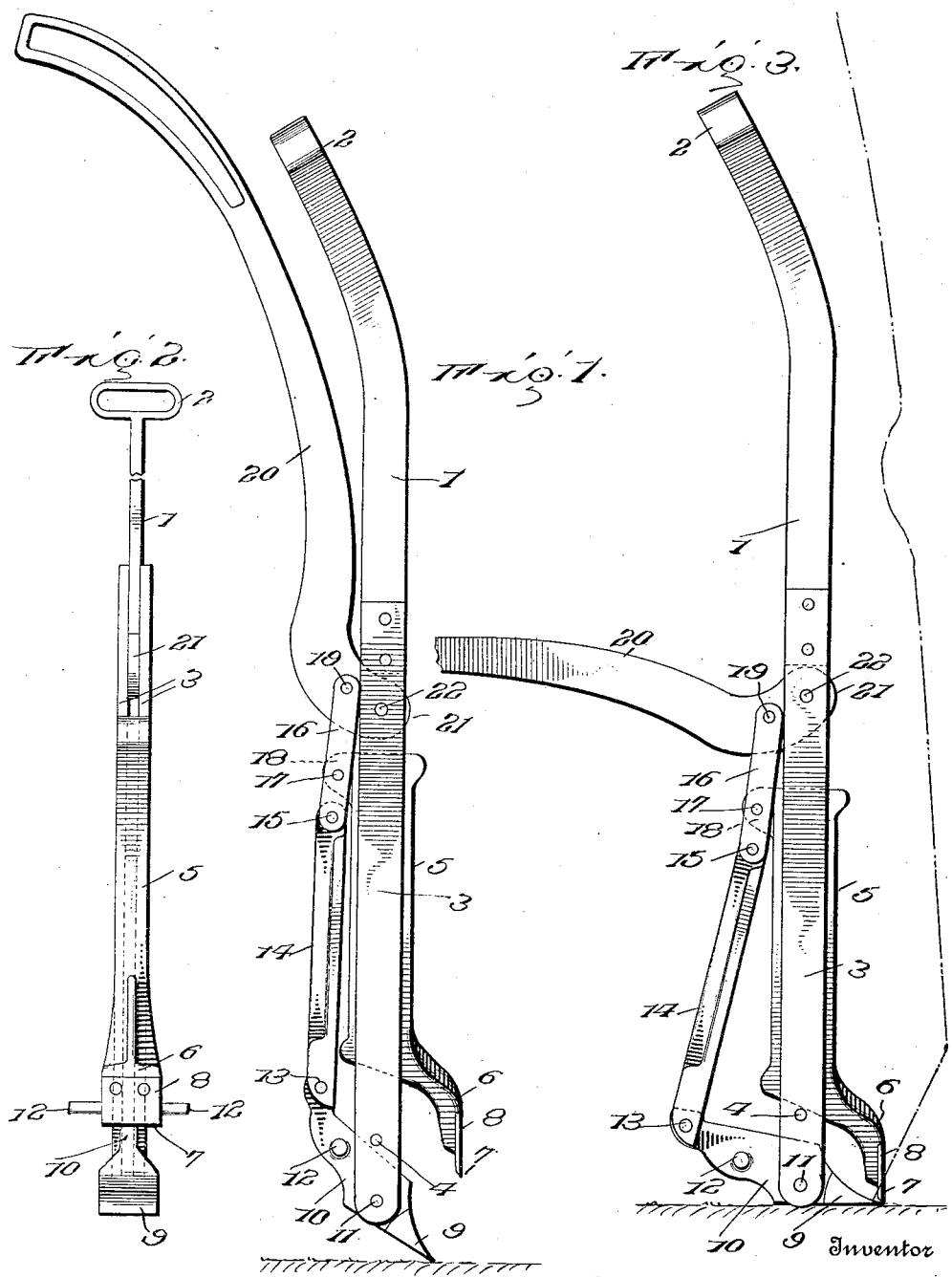

JOHN E. ARTHUR, OF LANE, ILLINOIS.

HOOF-CLIPPER.

1,054,078.   Specification of Letters Patent.   Patented Feb. 25, 1913.

Application filed June 10, 1912. Serial No. 702,819.

*To all whom it may concern:*

Be it known that I, JOHN E. ARTHUR, a citizen of the United States, residing at Lane, in the county of Dewitt and State of Illinois, have invented certain new and useful Improvements in Hoof-Clippers, of which the following is a specification.

This invention relates to certain improvements in devices for trimming hoofs; and the objects and nature of the invention will be readily understood by those skilled in the art in the light of the following explanation of the accompanying drawings illustrating what I now believe to be the preferred embodiment from among other formations and arrangements within the spirit and scope of my invention.

It is an object of the invention to provide efficient comparatively simple means that can be utilized by the farmer or horseman for trimming hoofs while the animal stands and without necessitating handling or raising the animal's hoof or leg and without requiring the presence of a farrier, and which will trim the edge of the hoof vertically or transversely.

The invention consists in certain novel features in construction and in combinations and arrangements as more fully and particularly set forth hereinafter.

Referring to the accompanying drawings:—Figure 1, is a side elevation of an implement constructed in accordance with my invention and showing the same in position to be applied to an animal's hoof resting on the ground or other soft floor. Fig. 2, is a front elevation of the implement with its parts in the position of Fig. 1. Fig. 3, is an elevation with the parts in the position assumed at the completion of a trimming or clipping stroke.

The implement comprises a vertically elongated standard consisting of stiff handle bar or shank 1, at its upper end having loop or other handle 2, and at its lower end rigidly secured to the upper ends of a pair of spaced parallel stiff bars 3, forming the lower or remaining portion of the standard with a longitudinal slot or guideway. These bars 3, are suitably spaced apart and are rigidly connected together as by cross bolt or rivet 4, and by rivets or bolts securing the same to handle bar 1. A longitudinally elongated head, slide or block 5, is confined between the bars 3, against lateral deflection therefrom and yet so as to reciprocate longitudinally of the standard. The cross pin or rivet 4, forms a stop limiting the downward movement of said sliding head and said head is free to reciprocate between its limit of upward movement and said stop. This head is usually formed with a forward and downward front extension, flange, or projection 6, at its front end provided with a transverse horizontal depending cutting edge 7. In the particular example illustrated, this edge 7, is formed by a flat vertical blade or knife 8, secured in or to a suitable seat or socket formed in the vertical front face of the depending flange 6.

In the particular example illustrated the knife or cutting edge 7, is located a considerable distance in front of the standard and also a considerable distance below the horizontal plane of the lower end of the head between bars 3.

The implement includes a lower jaw or blade to coöperate with the cutting edge 7, in performing the clipping operation. This blade or jaw 9, is formed on or by the projecting front end of a lever or foot block 10, arranged between the lower ends of bars 3, and united thereto by cross pin 11, forming a pivot or fulcrum on which said block is rockable vertically. The front end of said block projects forwardly beyond the lower end of the standard and is transversely increased in width to form the forwardly projecting transverse or horizontal shovel-like blade or jaw 9. The rear end of said block is extended rearwardly beyond the lower end of the standard and is provided with rigid lateral foot rests 12. The rear extremity of said block is pivoted at 13, to the lower end of foot block actuating link 14. The upper end of said link 14, is pivoted at 15, to the lower end of a short vertically-disposed lever 16, fulcrumed at 17 intermediate its length to a lug 18, projecting rearwardly from the upper end of the sliding head carrying cutting edge 7. The upper end of lever 16, is pivoted at 19, to the elbow of vertically swingable handle or lever 20, extending upwardly in rear of the upper portion of the standard and having an elbow at its lower end at 21, extending between the upper portions of bars 3, and fulcrumed thereto on axis 22, to swing vertically.

When the handle or operating lever 20, is in the position shown by Fig. 1, the knife head is held thereby at its limit of upward movement, and the foot block is held thereby in inclined position with its blade or jaw at its limit of downward movement, and the implement is in position to be applied to the animal's hoof for clipping the same. In applying the implement the operator uses the implement approximately as he would a spade by placing his foot on one of the rests 12, and applying sufficient force to drive the blade or jaw into the ground beneath the hoof to be clipped and so that the cutting edge of the knife head will be located directly over the portion of the hoof edge to be clipped off. Then while holding the standard by one hand, the handle lever is swung down, which operation forces down the knife head and simultaneously elevates the blade or jaw so that the desired portion of the hoof edge is caught between the jaw and cutting edge. During the cutting operation, the jaw acts as a platen or anvil and presses upwardly against the bottom of the hoof edge while the cutting edge is descending through said hoof edge directly over said jaw. The handle lever can be assisted in its downward actuating swing by downward pressure of the foot on one of the foot rests 12.

It will be readily understood by those skilled in the art, that downward swing of the handle lever, actuates the knife head and foot block on their operating strokes through the medium of the short lever and link hereinbefore described, and that upward swing of said handle returns said head and foot block to their normal positions.

With the implement, a hoof can be trimmed around the edge by vertical or transverse cuts while the animal is standing on the earth or other soft material floor and without necessitating the elevation of the hoof from the floor. The swinging or fulcrumed foot block enables the operator to place the blade or jaw into the desired position beneath a hoof held to the ground or other soft floor, and also affords an opening or space between the jaw and cutting edge of maximum vertical length to receive the hoof. The arrangement is such as to attain maximum leverage on the operating parts to drive them on their actuating strokes.

It is evident that various changes, variations and modifications might be resorted to without departing from the spirit and scope of the invention and hence I do not wish to limit myself to the exact disclosure hereof.

What I claim is:—

1. A hoof clipper comprising an elongated handle-forming standard, a block carried by said standard and arranged at the lower end thereof and formed with a spade-like blade normally projecting downwardly from and at an angle to said standard and adapted to be forced into the ground beneath the hoof to be trimmed and to be swung up at the bottom of said hoof, a hoof trimming knife adapted to coöperate with said blade and movable on said standard toward and from said blade, said knife being mounted and movable on said standard above said blade, and operating means mounted on and carried by said standard.

2. A hoof clipper consisting essentially of a handle-forming standard, a spade-like blade pivotally joined to said standard and normally projecting downwardly from its lower end and adapted to be forced into the ground beneath the hoof to be trimmed and to be swung up against the bottom of said hoof, a trimming knife carried by and movable on said standard toward and from said blade and arranged above the same, and actuating means carried by and movable on said standard and operatively connected with the knife and blade to simultaneously move the same in opposite directions on their operative strokes.

3. A hoof clipper comprising a vertical standard, a head having a hoof trimming edge and movable longitudinally of said standard, a vertically rockable foot block having a projecting jaw to coöperate with said knife, said block arranged transversely of and fulcrumed to said standard, and operating means for simultaneously operating said head and said block on their operative strokes.

4. A hoof trimmer comprising a standard, a movable head carried thereby and slidable longitudinally thereof and provided with a hoof trimming cutting edge, a vertically-rockable member carried by said standard and arranged transversely of the lower end thereof and provided with a blade-like jaw to enter the ground beneath the hoof, and an operating member having actuating connections to said head and to said member.

5. A hoof trimmer comprising a standard, a movable carrier provided with a hoof trimming knife edge, a vertically rockable foot block provided with a blade-like jaw and with a foot piece, and an operating member having actuating connections to said carrier and said block.

6. A hoof trimmer comprising a standard, a slidable head provided with a front depending cutting edge, a rockable foot block fulcrumed to said standard and at its front end provided with a jaw, a vertically swingable handle carried by said standard, a rocking lever fulcrumed to said head and pivoted to said handle, and a link pivoted to said lever and to said block.

7. A hoof trimmer, comprising a vertical handle-forming standard, a vertically movable trimming knife on and carried by said standard, a vertically rockable block fulcrumed at the lower end of the standard and arranged transversely thereof having a knife like jaw, and an operating member having actuating connection with the knife and block.

In testimony whereof I affix my signature in presence of two witnesses.

JOHN E. ARTHUR.

Witnesses:
SAMUEL HICKLE,
MARY A. HICKLE.

Copies of this patent may be obtained for five cents each, by addressing the "Commissioner of Patents, Washington, D. C."